UNITED STATES PATENT OFFICE.

MORRIS B. MANWARING, OF BAYONNE, NEW JERSEY, ASSIGNOR TO THE NEW YORK AND CHICAGO CHEMICAL COMPANY, OF NEW YORK.

PEPTONE-PEPSIN.

SPECIFICATION forming part of Letters Patent No. 327,567, dated October 6, 1885.

Application filed May 11, 1885. Serial No. 165,105. (Specimens.)

*To all whom it may concern:*

Be it known that I, MORRIS B. MANWARING, of Bayonne, county of Hudson, and State of New Jersey, have invented a new and useful Improvement in Pepsin, of which the following is a full, clear, and exact description.

The object of my invention is to produce an improved pepsin which shall be more efficient in aiding digestion than the pepsins heretofore known and used.

My improved pepsin is prepared in the following manner: I first take one hundred stomachs of the hog or other animal, and after cleansing and cutting them into very small pieces submerge them in about ten gallons of water at ordinary temperature—60° to 65° Fahrenheit—to which has been added about two pounds of hydrochloric acid, U. S. Pharmacopœia. I also dissolve about sixty pounds (more or less may be used, as desired) of pure dried egg albumen in water, using preferably about seventy-five gallons of tepid water. This solution of albumen is then poured in about forty gallons of water previously heated to about 175° Fahrenheit while undergoing active agitation. The heating and stirring are continued, so that the mixture is kept slightly above the coagulating-point of egg albumen until all of the solution of albumen has been added, whereupon it is immediately cooled below the coagulating-point by the addition of about seventy-five gallons of cold water, and the whole then allowed to cool naturally or artificially, if desired, to the ordinary temperature of 60° to 70° Fahrenheit, when about nine pounds of hydrochloric acid, U. S. Pharmacopiœa, is added. The resulting mixture of the egg albumen, &c., is mixed together with the previous preparation of stomachs and acid water, and the whole constantly or at short intervals agitated until the coagulated albumen is digested. Thereupon the solution is allowed to clarify by standing over night. The clear liquor is drawn off free from the residuum of the stomachs and other matter and concentrated in vacuo at about 100° to 110° Fahrenheit to a sirupy consistence, then dried and scaled in the usual manner, as directed by the U. S. Pharmacopœia for the class of scale preparations.

If preferred, the ordinary pepsin, as made by the published process of E. Scheffer, can be employed instead of the stomachs, taking care to first separate the contained chloride of sodium by redissolving the pepsin in water and precipitating by alcohol.

An important advantage of my improved pepsin is that by the use of a nearly pure albumen in such an easily-digestible condition the high temperature necessary to completely digest the animal stomachs is avoided, and the solution and formation of the several inactive strongly hygroscopic and otherwise objectionable substances, which in the ordinary scale pepsins frequently amount to thirty-four per centum of the whole, are practically avoided.

I am aware of the custom of digesting together an acidulated mixture of coagulated egg albumen with pepsin as a means of ascertaining the strength of the pepsin, and also that dry peptones as a glassy, brittle mass have been obtained, as shown by New Remedies, February, 1878, p. 46, from Phar. Zeitung, 1877, and by Proceedings of the Amer. Phar. Assoc., 1878, p. 633.

What I claim as my invention, and desire to secure by Letters Patent, is—

1. The method of producing peptone-pepsin by the action of a solution of pepsin on an acidulated mixture of coagulated egg albumen with water, whereby a peptone-pepsin is produced, which is thereafter reduced to scale form by evaporation in the manner described.

2. The improved peptone-pepsin consisting of a composition in scale form of pepsin with peptonized egg albumen.

M. B. MANWARING.

Witnesses:
GEORGE B. STODDARD,
WM. F. LETT.